United States Patent
Behrens

(10) Patent No.: US 11,499,004 B2
(45) Date of Patent: *Nov. 15, 2022

(54) CURING AGENT COMPOSITION FOR AN EPOXY RESIN COMPOUND, EPOXY RESIN COMPOUND AND MULTI-COMPONENT EPOXY RESIN SYSTEM

(71) Applicant: Hilti Aktiengesellschaft, Schaan (LI)

(72) Inventor: Nicole Behrens, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 17/276,939

(22) PCT Filed: Sep. 9, 2019

(86) PCT No.: PCT/EP2019/073939
§ 371 (c)(1),
(2) Date: Mar. 17, 2021

(87) PCT Pub. No.: WO2020/058016
PCT Pub. Date: Mar. 26, 2020

(65) Prior Publication Data
US 2022/0033570 A1    Feb. 3, 2022

(30) Foreign Application Priority Data
Sep. 19, 2018 (EP) .................... 18195417

(51) Int. Cl.
C08G 59/50 (2006.01)
C08G 59/24 (2006.01)
C08G 59/56 (2006.01)
C09K 8/44 (2006.01)

(52) U.S. Cl.
CPC ....... *C08G 59/5033* (2013.01); *C08G 59/245* (2013.01); *C08G 59/56* (2013.01); *C09K 8/44* (2013.01)

(58) Field of Classification Search
CPC .. C08G 59/5033; C08G 59/245; C08G 59/56; C09K 8/44
USPC ....................................... 528/124
See application file for complete search history.

(56) References Cited

U.S. PATENT DOCUMENTS

| 9,695,273 B2 | 7/2017 | Gorodisher et al. |
| 10,189,744 B2 | 1/2019 | Dureault et al. |
| 2011/0315916 A1 | 12/2011 | Wilson et al. |
| 2015/0045528 A1 | 2/2015 | Gorodisher et al. |
| 2016/0159690 A1 | 6/2016 | Dureault et al. |
| 2020/0362161 A1 | 11/2020 | Behrens |

FOREIGN PATENT DOCUMENTS

| EP | 2 826 798 | 1/2015 | |
| EP | 3162829 A1 * | 5/2017 | ............ C09J 163/00 |
| JP | 2008094961 | 4/2008 | |
| JP | 2015502416 | 1/2015 | |
| WO | 2013/063236 | 5/2012 | |
| WO | 2019/115110 | 6/2019 | |

OTHER PUBLICATIONS

International Search Report dated Oct. 29, 2019 in PCT/EP2019/073939, with English translation, 5 pages.
Written Opinion dated Oct. 29, 2019 in PCT/EP2019/073939, with English translation, 9 pages.
U.S. Appl. No. 15/733,090, filed May 14, 2020, 2020/0362161, Nicole Behrens.
U.S. Appl. No. 17/276,852, filed Mar. 17, 2021, Behrens et al.
U.S. Appl. No. 17/276,914, filed Mar. 17, 2021, Behrens et al.
U.S. Appl. No. 17/276,968, filed Mar. 17, 2021, Behrens et al.
U.S. Office Action dated Mar. 29, 2022 in U.S. Appl. No. 17/276,968, 14 pages.

* cited by examiner

*Primary Examiner* — David T Karst
(74) *Attorney, Agent, or Firm* — Grüneberg and Myers PLLC

(57) ABSTRACT

A curing agent composition for an epoxy resin compound useful for the chemical fastening of construction elements, an epoxy resin compound, and a multi-component epoxy resin system are provided. Methods for the chemical fastening of construction elements in boreholes and the use of a salt (S) as an accelerator in an epoxy resin compound for chemical fastening are provided, the epoxy resin compound including a benzoxazine-amine adduct and an amine which is reactive to epoxy groups.

21 Claims, No Drawings

CURING AGENT COMPOSITION FOR AN EPOXY RESIN COMPOUND, EPOXY RESIN COMPOUND AND MULTI-COMPONENT EPOXY RESIN SYSTEM

CROSS-REFERENCE TO RELATED APPLICATIONS

This application is a National Stage entry under § 371 of International Application No. PCT/EP2019/073939, filed on Sep. 9, 2019, and which claims the benefit of European Application No. 18195417.3, filed on Sep. 19, 2018. The content of each of these applications is hereby incorporated by reference in its entirety.

BACKGROUND OF THE INVENTION

Field of the Invention

The invention relates to a curing agent composition for an epoxy resin compound for the chemical fastening of construction elements, to an epoxy resin compound, and to a multi-component epoxy resin system. The invention further relates to a method for the chemical fastening of construction elements in boreholes. The invention also relates to the use of a salt (S) as an accelerator in an epoxy resin compound for chemical fastening, the epoxy resin compound comprising a benzoxazine-amine adduct and an amine which is reactive to epoxy groups.

Multi-component mortar compounds based on curable epoxy resins and amine curing agents have been known for some time and are used as adhesives, spackling pastes for repairing cracks and chemical anchors for fastening construction elements such as anchor rods, reinforcing bars, and screws in boreholes of various substrates. Known mortar compounds are, however, highly limited in their use in countries having high temperatures, such as the United Arab Emirates, because the load capacity (failure loads) of the mortar compounds starts to decrease from a temperature of 35° C. Furthermore, high temperatures have a negative impact on the handling behavior and processing time of the mortar compounds on construction sites.

With conventional mortar compounds, a high proportion of low-viscosity constituents, a low filler proportion and coarse fillers should be provided in order to achieve good handling behavior, although this is disadvantageous in terms of low creep behavior under a load at elevated temperatures. In addition, a long processing time is achieved as a result of a high proportion of non-reactive or non-cross-linking diluents and less reactive components, and this prevents a short curing time.

Mortar compounds based on epoxy amine generally have slow curing kinetics, an extended pot life or gel time, and usually low heat resistance and creep resistance. This means that they can be handled easily and reach good load values only in a narrow temperature range. The curing time of mortar compounds based on epoxy amine is generally set by selecting an appropriate amine and/or by adding catalysts such as tertiary amines, alcohols and acids.

Description of Related Art

It is known from the prior art to use a combination of benzoxazine-amine adducts with amines in curing agent components for multi-component epoxy resin compounds. For instance. EP 014 99 89 A2 describes an aqueous dispersion of benzoxazine and protonated amine. The dispersions can be dried and cured so as to produce surface coatings and primers. The mixture of benzoxazine and amine is cured at 135° C.

WO 2013/063236 A1 describes a multi-component system, in particular for coatings, which consists of benzoxazine, amine and epoxy and which cures at elevated temperatures of approximately 100° C. Benzoxazine-amine-epoxy adducts and benzoxazine-amine adducts are put forward as possible intermediate products.

WO 2013/048851 A1 describes oligomers and polymers from the reaction of benzoxazine and a mixture of amine and thiol. A curable composition of benzoxazine, thiol and amine is disclosed, the curing temperature being at least 100° C.

The disadvantage of the epoxy systems known from the prior art, in which benzoxazine-amine adducts are used, is their slow curing time. This makes these systems unsuitable for chemical fastening, in particular for anchoring fastening means in boreholes as chemical anchors. Increasing the temperature to above 80° C. is impractical in particular for outdoor applications. In particular, the mixtures known from the prior art, which consist of a benzoxazine, amine and epoxy component, therefore cure too slowly for use on construction sites and are therefore unsuitable.

The as yet unpublished patent application having application Ser. No. 17/207,545.9 describes a curing agent composition comprising a benzoxazine-amine adduct and an amine, the benzoxazine-amine adduct being present in the curing agent composition in a proportion of at least 8.5 wt. %. Due to the OH and tert-amine functionalities inherent in benzoxazine-amine adducts, which accelerate the reaction of epoxy with amines, the use of benzoxazine-amine adducts can usually take place without poly- or oligomeric accelerators (such as novolacs) in order to avoid problems such as those related to viscosity. Nevertheless, epoxy resin compounds in which benzoxazine-amine adducts are used as curing agents generally have long curing times of approximately 10 to 12 hours. This is particularly important if the curing agent composition has a high proportion of a benzoxazine-amine adduct.

However, since long curing times of chemical anchors delay work on the construction site, it is advantageous to work with epoxy-amine systems which already have sufficient strength e.g. after six hours.

SUMMARY OF THE INVENTION

The problem addressed by the invention is therefore that of providing an epoxy resin compound which contains at least one benzoxazine-amine adduct and which is suitable for fastening purposes. By comparison with conventional mortar compounds, the curing time is intended to be shorter with a comparably high pull-out strength. In particular, the problem addressed by the invention is that of providing an epoxy resin compound which, by comparison with conventional mortar compounds, has a shorter curing time and improved pull-out strength at elevated temperatures, for example in a temperature range of from 35° C. to 50° C. Furthermore, it is desirable for the epoxy resin compound to exhibit improved pull-out strength in water-filled boreholes by comparison with conventional mortar compounds.

The problem addressed by the invention is solved by a curing agent composition according to the below embodiments. Preferred embodiments of the curing agent composition according to the invention are provided in the description below, which may optionally be combined with one another.

The invention further relates to an epoxy resin compound, and to a multi-component epoxy resin system according to embodiments below. Preferred embodiments of the epoxy resin compound according to the invention and of the multi-component epoxy resin system are provided in the description below, which may optionally be combined with one another.

The invention further relates to a method for the chemical fastening of construction elements in boreholes as described below.

The invention also covers the use of at least one salt (S) as an accelerator in an epoxy resin compound according to the below description.

DETAILED DESCRIPTION OF THE INVENTION

Within the context of the invention, the terms used above and in the following description have the following meanings:

"aliphatic compounds" are acyclic or cyclic, saturated or unsaturated carbon compounds, excluding aromatic compounds;

"cycloaliphatic compounds" are compounds having a carbocyclic ring structure, excluding benzene derivatives or other aromatic systems;

"araliphatic compounds" are aliphatic compounds having an aromatic backbone such that, in the case of a functionalized araliphatic compound, a functional group that is present is bonded to the aliphatic rather than the aromatic part of the compound;

"aromatic compounds" are compounds which follow Hückel's rule (4n+2);

"amines" are compounds which are derived from ammonia by replacing one, two or three hydrogen atoms with hydrocarbon groups, and have the general structures $RNH_2$ (primary amines), $R_2NH$ (secondary amines) and $R_3N$ (tertiary amines) (see: IUPAC Chemical Terminology. 2nd ed. (the "Gold Book"), compiled by A. D. McNaught and A. Wilkinson, Blackwell Scientific Publications, Oxford (1997)): and "salts" are compounds that are made up of positively charged ions (cations) and negatively charged ions (anions). There are ionic bonds between these ions. The expression "salts of nitric acid" describes compounds which are derived from nitric acid ($HNO_3$) and which comprise a nitrate ($NO_3^-$) as an anion. The expression "salts of nitrous acid" describes compounds which are derived from nitrous acid ($HNO_2$) and which comprise a nitrite ($NO_2^-$) as an anion. The expression "salts of halogens" describes compounds which comprise an element from group 7 of the periodic table as an anion. In particular, the expression "salts of halogens" should be understood to mean compounds which comprise a fluoride ($F^-$), chloride ($Cl^-$), bromide ($Br^-$) or iodide ($I^-$) as an anion. The expression "salts of trifluoromethanesulfonic acid" describes compounds which are derived from trifluoromethanesulfonic acid ($CF_3SO_3H$) and which comprise a triflate ($CF_3SO_3^-$) as an anion. In the context of the present invention, the term "salt" also covers the corresponding hydrates of the salts. The salts (S) used as accelerators are also referred to as "salts" in the context of the present invention.

According to the invention, the curing agent composition (B) comprises a benzoxazine-amine adduct, the benzoxazine-amine adduct being selected from the group consisting of substances according to formula Ia, substances according to formula Ib and mixtures thereof, having the following structures:

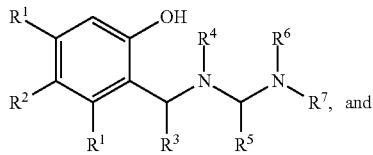

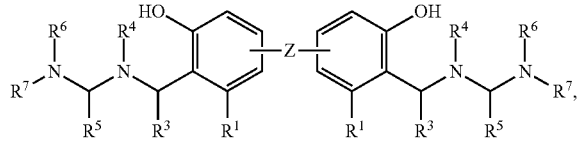

where $R^1$, $R^2$, $R^3$, $R^4$ and $R^5$ are each independently selected from H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid or alkylsulfonyl groups, and also from combinations of two or more of these groups, it being possible for the groups to each be unsubstituted or optionally substituted;

where $R^6$ and $R^7$ each independently represent H or an amino, diamino or polyamino group selected from the group consisting of aliphatic, alicyclic or aromatic amine groups, and also combinations of two or more of these groups, it being possible for the groups to each be unsubstituted or optionally substituted;

where Z is selected from a direct bond, —C(O)—, —S—, —O—, —S(O)—, —S(O)$_2$—, —C(R$^8$)(R$^9$)—, —[C(R$^8$)(R$^9$)]$_m$—C(R$^8$)(R$^9$)—[C(R$^{10}$)(R$^{11}$)]$_n$—, —[C(R$^8$)(R$^9$)]$_m$—C(R$^8$)(aryl)-[C(R$^{10}$)(R$^{11}$)]$_n$—, —[C(R$^8$)(R$^9$)]$_m$—C(O)—[C(R$^{10}$)(R$^{11}$)]$_n$—, —[C(R$^8$)(R$^9$)]$_m$—S—[C(R$^{10}$)(R$^{11}$)]$_n$—, —[C(R$^8$)(R$^9$)]$_m$—O—[C(R$^{10}$)(R$^{11}$)]$_n$—, —[C(R$^8$)(R$^9$)]$_m$—S(O)—[C(R$^{10}$)(R$^{11}$)]$_n$—, —[C(R$^8$)(R$^9$)]$_m$—S(O)$_2$—[C(R$^{10}$)(R$^{11}$)]$_n$—, a divalent heterocycle and —[C(R$^8$)(R$^9$)]$_m$-arylene-[C(R$^{10}$)(R$^{11}$)]$_n$—, where m and n are each independently between 0 and 10, preferably between 0 and 5, and where $R^8$, $R^9$, $R^{10}$ and $R^{11}$ each independently have the same meaning as the groups $R^1$ to $R^5$.

Furthermore, the curing agent composition (B) comprises an amine which is reactive to epoxy groups and is selected from the group consisting of aliphatic, alicyclic, aromatic and araliphatic amines and which has on average per molecule at least two reactive hydrogen atoms bonded to a nitrogen atom.

According to the invention, at least one salt (S) from the group consisting of salts of nitric acid, salts of nitrous acid, salts of halogens, salts of trifluoromethanesulfonic acid and combinations thereof is used as an accelerator. The salt (S) is preferably contained in the curing agent composition in a proportion of from 0.1 to 15 wt. %, based on the total weight of the curing agent composition.

The prior art describes benzoxazine-amine adducts which are present in solution form in equilibrium with the relevant benzoxazine and amine component. These mixtures can be polymerized by heating. If an epoxy component is added to a mixture of benzoxazine and amine, a large number of different adducts are formed from these three components, which adducts are also polymerized when heated.

The invention makes it possible to use benzoxazine-amine-adduct-containing epoxy resin compounds as what are referred to as "chemical anchors" at elevated temperatures on a construction site. A chemical anchor is thus obtained which has advantageous load properties even after a short curing time at elevated temperatures.

The use of the curing agent composition according to the invention in an epoxy resin compound for fastening purposes leads to a considerable acceleration of the curing reaction. The cured compounds exhibit outstanding pull-out strength at elevated temperatures and can therefore be subjected to loading after only a short period of time, within approximately 4 to 6 hours, and sometimes even much earlier. The curing agent composition according to the invention and the epoxy resin compounds prepared therefrom are therefore particularly suitable for use in countries having high temperatures. Furthermore, the cured compounds exhibit excellent pull-out strength in the water-filled borehole.

For the benzoxazine-amine adducts according to structures Ia and Ib, it is preferred that $R^3$ and $R^5$ are each H.

Furthermore, Z is preferably selected from a direct bond, —$C(R^8)(R^9)$—, —$C(R^8)$(aryl)-, —C(O)—, —S—, —O—, —S(O)—, —$S(O)_2$—, a divalent heterocycle and —$[C(R^8)(R^9)]_m$-arylene-$[C(R^{10})(R^{11})]_n$—, where m and n are each independently between 0 and 5. Z is particularly preferably selected from a direct bond or —$C(R^8)(R^9)$—, where $R^8$ and $R^9$ are each independently selected from H or $C_1$-$C_4$ alkyl groups, preferably H or methyl, or together form a divalent lactone group.

In an advantageous embodiment, $R^3$ and $R^5$ in the benzoxazine-amine adduct are each H, according to the structures Ia and Ib, and Z has the meaning given above.

In a preferred embodiment, the benzoxazine-amine adduct is present in the curing agent composition (B) in a proportion of from 9 wt. % to 65 wt. %, preferably from 9.5 wt. % to 55 wt. %, more preferably from 10 wt. % to 45 wt. %, and particularly preferably from 10 wt. % to 35 wt. %.

The benzoxazine-amine adduct is obtained by reacting at least one benzoxazine component with at least one amine component, preferably an aromatic or araliphatic amine, a diamine component and/or polyamine component. Without restricting the scope of the invention, suitable benzoxazines for the preparation of the benzoxazine-amine adduct preferably have the following structure:

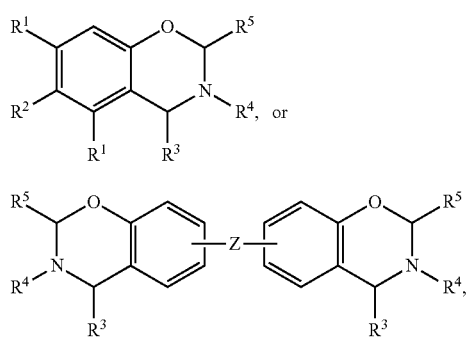

where $R^1$ to $R^5$ and Z have the meanings given above.

In advantageous embodiments of the benzoxazine-amine adduct, $R^3$ and $R^5$ each represent H, and Z is selected from a direct bond, —$C(R^8)(R^9)$—, —$C(R^8)$(aryl)-, —C(O)—, —S—, —O—, —S(O)—, —$S(O)_2$—, a divalent heterocycle and —$[C(R^8)(R^9)]_m$-arylene-$[C(R^{10})(R^{11})]_n$—, where m and n are each independently between 0 and 5. Z is particularly preferably selected from a direct bond or —$C(R^8)(R^9)$—, where $R^8$ and $R^9$ are each independently selected from H or $C_1$-$C_4$ alkyl groups, preferably H or methyl, or together form a divalent lactone group.

The benzoxazines are preferably selected from the following structures:

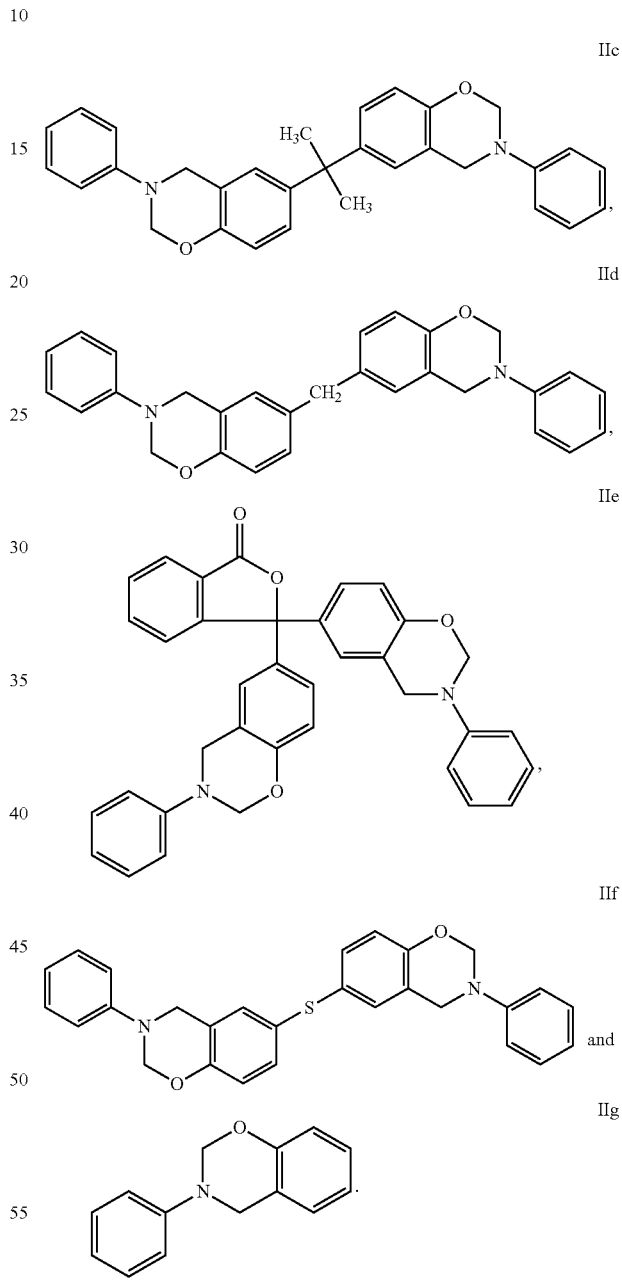

Without restricting the scope of the invention, suitable amines for the preparation of the benzoxazine-amine adduct and/or for use in the curing agent composition (B) as an amine that is reactive to epoxy groups are preferably selected from the group of the unbranched or branched $C_2$-$C_{10}$ alkyl diamines, the $C_2$-$C_{10}$ polyalkylene polyamines and the aromatic and araliphatic amines which preferably contain a substituted or unsubstituted benzene ring.

The amine can be used either individually or as a mixture of two or more of the mentioned amines. An amine mixture which is composed of two or more amines has been found to be advantageous.

The alkyl diamines are preferably selected from 2,2,4- or 2,4,4-trimethyl-1,6-diaminohexane and mixtures thereof (TMD), 3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1, 5-pentanediamine (DYTEK A), (3(4),8(9)bis(aminomethyl) dicyclo[5.2.1.0$^{2,6}$]decane and isomer mixtures thereof (TCD-diamine), aminomethyltricyclo[5.2.1.0$^{2,6}$]decane and isomer mixtures thereof (TCD-amine) and 1,6-hexamethylenediamine.

The polyalkylene polyamines are preferably selected from diethylene triamine (DETA), triethylene tetraamine (TETA), tetraethylene pentamine (TEPA) and pentaethylene hexamine (PEHA).

The aromatic amines are preferably selected from diethylmethylbenzenediamine and 4,4'-sulfonyldianilines and the araliphatic polyamines are preferably selected from 1,3-benzenedimethanamine (mXDA) and 1,4-benzenedimethanamine (pXDA) and N,N'-dimethyl-1,3-benzenedimethanamine.

Particularly preferred amines are 3-aminomethyl-3,5,5-trimethylcyclohexane (IPDA), 2-methyl-1,5-pentanediamine (DYTEK A), m-xylylenediamine (mXDA) and 1,3-bis(aminomethylq-cyclohexane (1,3-BAC) and mixtures thereof.

The following amines are also suitable, for example: 1,2-diaminoethane (ethylenediamine), 1,2-propanediamine, 1,3-propanediamine, 1,4-diaminobutane, 2,2-dimethyl-1,3-propanediamine (neopentanediamine), diethylaminopropylamine (DEAPA), 1,3-diaminopentane, 1,2-bis(aminomethyl)cyclohexane, 1,2- and 1,4-diaminocyclohexane (1,2-DACH and 1,4-DACH), methylcyclohexyldiamine (mCDA), bis(4-amino-3-methylcyclohexyl)methane, 4-azaheptane-1,7-diamine, 1,11-diamino-3,6,9-troxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis-(3-aminopropyl)methylamine, 5-(aminomethyl)bicyclo[[2.2.1]hept-2-yl]methylamine (NBDA, norbornane diamine), dimethyldipropylenetramine, dimethylaminopropyl-aminopropylamine (DMAPAPA), diaminodicyclohexylmethane (PACM), mixed polycyclic amines (MPCA) (e.g. Ancamine 2168), dimethyldiaminodicyclohexylmethane (Laromin C260), N-ethylaminopiperazine (N-EAP), 1,14-diamino-4,11-dioxatetradecane, dipropylenetriamine, N,N'-dicyclohexyl-1, 6-hexanediamine, N,N'-dimethyl-1,3-diaminopropane, N,N'-diethyl-1,3-diaminopropane, N,N-dimethyl-1,3-diaminopropane, secondary polyoxypropylene di- and triamines, 2,5-diamino-2,5-dimethylhexane, bis(aminomethyl)tricyclopentadiene, 1,8-diamino-p-menthane, bis-(4-amino-3,5-dimethylcyclohexyl)methane, dipentylamine, N-2-(aminoethyl)piperazine (N-AEP), N-3-(aminopropyl) piperazine and piperazine.

All of the substances mentioned above or mixtures thereof can be used as benzoxazine and amine components for the preparation of a benzoxazine-amine adduct. Various methods for the preparation of the benzoxazine-amine adduct are known to a person skilled in the art.

To prepare the benzoxazine-amine adduct, one of the above-mentioned benzoxazine components is preferably dissolved in a solvent and reacted with the amine component at an elevated temperature. The amine is preferably added in excess. Instead of the solvent, the benzoxazine can also be dissolved in an excess of amine component.

The reaction time is preferably 30 hours or less, more preferably 26 hours or less, and particularly preferably at most approximately 24 hours.

The reaction temperature is preferably at least 50° C. and less than 80° C., preferably less than 75° C., more preferably less than 70° C., even more preferably less than 65° C., and particularly preferably less than 60° C. The obtained benzoxazine-amine adduct is obtained in isolation or as a solution in the amine component.

According to a further method, the benzoxazine component is dissolved in the amine component. It can be mixed with other substances, in particular with substances that are additionally used in a curing agent composition (B). The mixture is stored for at least five days, preferably at least six days, more preferably at least one week, at room temperature (21° C.) in order to obtain a mixture having a proportion of benzoxazine-amine adduct of at least 8.5 wt. %. If the mixture is not stored for a sufficiently long time, the benzoxazine-amine adduct concentration is not sufficiently high.

The curing agent composition (B) further comprises at least one amine which is reactive to epoxy groups. The amine reactive to epoxy groups is a diamine or polyamine selected from the group consisting of aliphatic, alicyclic, aromatic and araliphatic amines and has on average per molecule at least two reactive hydrogen atoms bonded to a nitrogen atom. The amine can be selected from all of the amines mentioned above and the amines that are conventional for epoxy-amine systems and known to a person skilled in the art.

Examples of suitable amines are given below, without, however restricting the scope of the invention: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 1,3-diaminopentane, 2,2,4- or 2,4,4-trimethyl-1,6-diaminohexane and mixtures thereof (TMD), 1,3-bis(aminomethyl)-cyclohexane (1,3-BAC), 1,2-bis(aminomethyl) cyclohexane (1,2-BAC), hexamethylenediamine (HMD), 1,2- and 1,4-diaminocyclohexane (1,2-DACH and 1,4-DACH), bis(4-aminocyclohexyl)methane, bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis(3-aminopropyl)methylamine, triethylenetetramine (TETA), tetraethylenepentamine (TEPA), pentaethylenehexamine (PEHA), bis(4-amino-3-methylcyclohexyl)methane, 1,3-benzenedimethanamine (m-xylylenediamine, mXDA), 1,4-benzenedimethanamine (p-xylylenediamine, pXDA), 5-(aminomethyl)bicyclo[[2.2.1] hept-2-yl]methylamine (NBDA, norbornane diamine), dimethyldipropylenetriamine, dimethylaminopropylaminopropylamine (DMAPAPA), 2-methylpentandiamine (DYTEK A), 3-aminomethyl-3,5,5-trimethylcyclohexylamine (isophorone diamine (IPDA)), diaminodicyclohexyl methane (PACM), diethylmethylbenzenediamine (DETDA), 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3(4),8(9)bis(aminomethyldicyclo[5.2.1.0$^{2,}$ 6]decane (mixture of isomers, tricyclic primary amines; TCD-diamine), methylcyclohexyl diamine (MCDA), N,N'-diaminopropyl-2-methyl-cyclohexane-1,3-diamine, N,N'-diaminopropyl-4-methyl-cyclohexane-1,3-diamine, N-(3-aminopropyl)cyclohexylamine, and 2-(2,2,6,6-tetramethylpiperidin-4-yl)propane-1,3-diamine.

Preferred amines in the curing agent composition according to the invention are polyamines, such as 2-methylpentanediamine (DYTEK A), 3-aminomethyl-3,5,5-trimethylcyclohexane (IPDA), 1,3-benzenedimethanamine (m-xylylenediamine, mXDA), 1,4-benzenedimethanamine (p-xylylenediamine, PXDA), 1,6-diamino-2,2,4-trimethylhexane (TMD), diethylenetriamine (DETA), triethylenetetramine (TETA), tetraethylenepentamine (TEPA), pentaethylenehexamine (PEHA), N-ethylaminopiperazine (N-EAP), (3(4),8(9)bis(aminomethyl)dicyclo[5.2.1.0$^{2,6}$]decane (mixture of isomers, tricyclic primary amines; TCD-diamine), 1,14-diamino-4,11-dioxatetradecane, dipropylenetriamine, 2-methyl-1,5-pentanediamine, N,N'-dicyclohexyl-1,6-hexanediamine, N, N'-dimethyl-1,3-diaminopropane, N,N'-diethyl-1,3-diaminopropane, N,N-dimethyl-1,3-diaminopropane, secondary polyoxypropylenedi- and triamines, 2,5-diamino-2,5-dimethylhexane, bis(aminomethyl) tricyclopentadiene, 1,8-diamino-p-menthane, bis(4-amino-3,5-dimethylcyclohexyl)methane, 1,3-bis(aminomethyl) cyclohexane (1,3-BAC), dipentylamine, N-2-(aminoethyl) piperazine (N-AEP), N-3-(aminopropyl)piperazine, piperazine and methylcyclohexyl diamine (mCDA).

The amine reactive to epoxy groups and the amine used to prepare the benzoxazine-amine adduct can be the same or different. The same amines are preferably used both for the amine reactive to epoxy groups and for preparing the benzoxazine-amine adduct.

Thiols, dithiols and/or polythiols, preferably selected from the group consisting of aliphatic, alicyclic, aromatic and araliphatic thiols and mixtures thereof, can also be used as a replacement for the amines and/or as a further additive for the curing agent composition (B).

According to the invention, the curing agent composition contains at least one salt (S) as an accelerator. According to the invention, the salt (S) is at least one salt selected from the group consisting of salts of nitric acid, salts of nitrous acid, salts of halogens, salts of trifluoromethanesulfonic acid and combinations thereof. The salt (S) is preferably at least one salt selected from the group consisting of salts of nitric acid, salts of halogens, salts of trifluoromethanesulfonic acid and combinations thereof. It has been found to be particularly preferable for the salt (S) to be selected from the group consisting of nitrates ($NO_3^-$), iodides ($I^-$), triflates ($CF_3SO_3^-$) and combinations thereof.

Alkali metal nitrates, alkaline earth metal nitrates, lanthanide nitrates, aluminum nitrate, ammonium nitrate and mixtures thereof are particularly suitable salts of nitric acid. Corresponding salts of nitric acid are commercially available. Alkali metal nitrates and/or alkaline earth metal nitrates, such as $Ca(NO_3)_2$ or $NaNO_3$, are preferably used as salts of nitric acid. It is also possible to use a solution of a salt in nitric acid as the salt (S), for example a solution containing $Ca(NO_3)_2/HNO_3$. To prepare this solution, $CaCO_3$ is dissolved in $HNO_3$.

Alkali metal nitrites, alkaline earth metal nitrites, lanthanide nitrites, aluminum nitrite, ammonium nitrite and mixtures thereof are particularly suitable salts of nitrous acid. Corresponding salts of nitrous acid are commercially available. Alkali metal nitrites and/or alkaline earth metal nitrites, such as $Ca(NO_2)_2$, are preferably used as salts of nitrous acid.

Alkali metal halides, alkaline earth metal halides, lanthanide halides, aluminum halides, ammonium halides and mixtures thereof are particularly suitable salts of halogens. Corresponding salts of halogens are commercially available. The halogens are preferably selected from the group consisting of chloride, bromide, iodide and mixtures thereof, with iodides particularly preferably being used.

Alkali metal triflates, alkaline earth metal triflates, lanthanide triflates, aluminum triflate, ammonium triflate and mixtures thereof are particularly suitable salts of trifluoromethanesulfonic acid. Corresponding salts of trifluoromethanesulfonic acid are commercially available. Alkali metal nitrates and/or alkaline earth metal nitrates, such as $Ca(CF_3SO_3)_2$, are preferably used as salts of trifluoromethanesulfonic acid.

In principle, the cations of the salt (S) can be organic, inorganic or a mixture thereof. The cation of the salt (S) is preferably an inorganic cation.

Suitable organic cations are, for example, ammonium cations substituted with organic groups, such as $C_1$-$C_6$-alkyl groups, such as tetraethylammonium cations.

Suitable inorganic cations of the salt (S) are preferably cations selected from the group consisting of alkali metals, alkaline earth metals, lanthanides, aluminum, ammonium ($NH_4^+$) and mixtures thereof, more preferably from the group consisting of alkali metals, alkaline earth metals, aluminum, ammonium and mixtures thereof, and even more preferably from the group consisting of alkali metals, alkaline earth metals, aluminum and mixtures thereof. It is particularly preferable for the cation of the salt (S) to be selected from the group consisting of sodium, calcium, aluminum, ammonium and mixtures thereof.

The following compounds or components are therefore particularly suitable as the salt (S): $Ca(NO_3)_2$ (calcium nitrate, usually used as $Ca(NO_3)_2$ tetrahydrate), a mixture of $Ca(NO_3)_2/HNO_3$, $KNO_3$ (potassium nitrate), $NaNO_3$ (sodium nitrate), $Mg(NO_3)_2$ (magnesium nitrate, usually used as $Mg(NO_3)_2$ hexahydrate), $Al(NO_3)_3$ (aluminum nitrate, usually used as $Al(NO_3)_3$ nonahydrate), $NH_4NO_3$ (ammonium nitrate), $Ca(NO_2)_2$ (calcium nitrite), NaCl (sodium chloride), NaBr (sodium bromide), NaI (sodium iodide), $Ca(CF_3SO_3)_2$ (calcium triflate), $Mg(CF_3SO_3)_2$ (magnesium triflate), and $Li(CF_3SO_3)_2$ (lithium triflate).

The curing agent composition according to the invention can comprise one or more salts (S). The salts can be used both individually and in a mixture of two or more of the specified salts.

In order to improve the solubility properties of the salt (S) in the curing agent composition, the salt (S) can be dissolved in a suitable solvent and used accordingly as a solution. Organic solvents such as methanol, ethanol and glycerol, for example, are suitable for this purpose. However, water can also be used as the solvent, possibly also in a mixture with the above-mentioned organic solvents. In order to prepare the corresponding salt solutions, the salt (S) is added to the solvent and stirred, preferably until it is completely dissolved.

The salt (S) is preferably contained in the curing agent composition in a proportion of from 0.1 to 15 wt. %, based on the total weight of the curing agent composition. The salt (S) is preferably contained in the curing agent composition in a proportion of from 0.5 to 12 wt. %, more preferably in a proportion of from 1.0 to 10 wt. %, even more preferably in a proportion of from 1.5 to 8.0 wt. %, based on the total weight of the curing agent composition.

In a further advantageous embodiment, the curing agent composition (B) comprises at least one further additive selected from the group of accelerators, adhesion promoters, thickeners and fillers.

Non-reactive diluents (solvents) may preferably be contained in amount of up to 30 wt. %, based on the total weight of the curing agent composition, for example from 1 to 20 wt. %. Examples of suitable solvents are alcohols, such as methanol, ethanol or glycols, lower alkyl ketones such as acetone, di lower alkyl lower alkanoyl amides such as dimethylacetamide, lower alkyl benzenes such as xylenes or toluene, phthalic acid esters or paraffins. The amount of solvents is preferably ≤5 wt. %, based on the total weight of the curing agent composition.

The accelerators are contained in the curing agent composition (B) in a proportion by weight of from 0.001 to 20 wt. %, preferably from 0.001 to 5 wt. %, based on the total weight of the curing agent composition (B). Examples of suitable accelerators are in particular tris-2,4,6-dimethylaminomethylphenol, 2,4,6-tris(dimethylamino)phenol and bis[(dimethylamino)methyl]phenol. A suitable accelerator mixture contains 2,4,6-tris(dimethylaminomethyl)phenol and bis(dimethylaminomethyl)phenol. Mixtures of this kind are commercially available, for example as Ancamine® K54 (Evonik).

By using an adhesion promoter, the cross-linking of the borehole wall with the mortar compound is improved such that the adhesion increases in the cured state. Suitable adhesion promoters are selected from the group of silanes that have at least one Si-bound hydrolyzable group, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyl-diethoxysilane, N-2-(aminoethyl)-3-aminopropyl-triethoxysilane, 3-aminopropyl-trimethoxysilane, 3-aminopropyltriethoxysilane, N-phenyl-3-aminoethyl-3-aminopropyl-trimethoxysilane, 3-mercaptopropyltrimethoxysilane and 3-mercaptopropylmethyldimethoxysilane. In particular, 3-aminopropyl-trimethoxysilane (AMMO), 3-aminopropyltriethoxysilane (AMEO), 2-aminoethyl-3-aminopropyl-trimethoxysilane (DAMO) and trimethoxysilylpropyidiethylenetetramine (TRIAMO) are preferred as adhesion promoters. Further silanes are described, for example, in EP3000792 A1, the content of which is hereby incorporated in the present application.

The adhesion promoter can be contained in an amount of up to 10 wt. %, preferably from 0.1 to 5 wt. %, more preferably from 1.0 to 2.5 wt. %, based on the total weight of the curing agent composition.

Silicic acids are preferably used as thickeners. A thickener may be contained in an amount of up to 10 wt. %, preferably from 0.1 wt. % to 5 wt. %, based on the total weight of the curing agent composition (B).

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof are used as fillers. In addition, thickeners such as fumed silica can also be used as an inorganic filler. Particularly suitable fillers are quartz powders, fine quartz powders and ultra-fine quartz powders that have not been surface-treated, such as Millisil W3, Millisil W6, Millisil W8 and Millisil W12, preferably Millisil W12. Silanized quartz powders, fine quartz powders and ultra-fine quartz powders can also be used. These are commercially available, for example, from the Silbond product series from Quarzwerke. The product series Silbond EST (modified with epoxysilane) and Silbond AST (treated with aminosilane) are particularly preferred. Furthermore, it is possible for fillers based on aluminum oxide such as aluminum oxide ultra-fine fillers of the ASFP type from Denka, Japan ($d_{50}$=0.3 μm) or grades such as DAW or DAM with the type designations 45 ($d_{50}$<0.44 μm), 07 ($d_{50}$>8.4 μm), 05 ($d_{50}$<5.5 μm) and 03 ($d_{50}$<4.1 μm). Moreover, the surface-treated fine and ultra-fine fillers of the Aktisil AM type (treated with aminosilane, $d_{50}$=2.2 μm) and Aktisil EM (treated with epoxysilane, d50=2.2 μm) from Hoffman Mineral can be used.

The inorganic fillers can be added in the form of sands, flours, or molded bodies, preferably in the form of fibers or balls. The fillers can be present in one or all components of the multi-component epoxy resin system described below. A suitable selection of the fillers with regard to type and particle size distribution/(fiber) length can be used to control properties relevant to the application, such as rheological behavior, press-out forces, internal strength, tensile strength, pull-out forces and impact strength.

In an advantageous embodiment, the curing agent composition (B) has an AHEW (Amine Hydrogen Equivalent Weight) of from 20 to 1000 g/EQ, preferably from 30 to 500 g/EQ, more preferably from 40 to 350 g/EQ, even more preferably from 50 to 225 g/EQ, and particularly preferably from 50 to 150 g/EQ. The AHEW value is determined from the molecular weight (Mw) of the amine divided by the number of reactive hydrogen atoms per molecule (H eq.=Mw/functionality).

Experimentally, the AHEW value can be obtained by determining the glass transition temperature (Tg) from a mixture of epoxy resin (with known EEW) and an amine component. In this case, the glass transition temperatures of epoxy resin/amine mixtures are determined with different ratios. The sample is cooled at a heating rate of −20 K/min from 21 to −70° C., heated in a first heating cycle to 250° C. (heating rate 10 K/min), then re-cooled to −70° C. (heating rate −20 K/min) and heated to 200° C. in the last step (20 K/min). The mixture having the highest glass transition temperature in the second heating cycle ("Tg2") has the optimum ratio of epoxy resin and amine. The AHEW value can be calculated from the known EEW and the optimum epoxy resin/amine ratio.

EXAMPLE: EEW=158 G/MOL

Amine/epoxy resin mixture having a maximum Tg2: 1 g amine with 4.65 g epoxy resin $$AHEW\ (amine) = \frac{158}{4.65} = 34$$

The present invention further relates to an epoxy resin compound which comprises at least one curable epoxy resin and a curing agent composition as described above. The epoxy resin compound is preferably a multi-component epoxy resin compound, more preferably a two-component epoxy resin compound.

A large number of the compounds known to a person skilled in the art and commercially available for this purpose, which contain on average more than one epoxy group, preferably two epoxy groups, per molecule can be used as a curable epoxy in the epoxy resin component (A). These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxies are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an epoxy equivalent weight (EEW) of from 150 to 300 g/EQ are particularly preferably used.

Further examples are hexanediol diglycidyl ether, trimethylolpropane triglycidyl ether, bisphenol A epichlorohydrin resins and/or bisphenol F epichlorohydrin resins, for example having an average molecular weight of Mn≤2000 g/mol.

The present invention further relates to a multi-component epoxy resin system comprising an epoxy resin component (A) and a curing agent component, the epoxy resin component (A) containing a curable epoxy resin, and the curing agent component being a benzoxazine-amine adduct which is selected from the group consisting of substances according to formula Ia, substances according to formula Ib or mixtures thereof and an amine which is reactive to epoxy groups. The multi-component epoxy resin system also comprises a salt (S) selected from salts of nitric acid, salts of nitrous acid, salts of halogens, salts of trifluoromethanesulfonic acid and combinations thereof, the salt (S) being contained in the epoxy resin component (A) and/or in the curing agent component. The multi-component epoxy resin system is preferably a two-component epoxy resin system.

The above statements apply to the curable epoxy resin, the substances according to formula Ia and formula Ib and the salt (S).

The salt (S) used as an accelerator can be contained in the epoxy resin component (A) or in the curing agent component or in both the epoxy resin component (A) and the curing agent component. It is preferable for the salt (S) to be contained at least in the curing agent component, preferably only in the curing agent component. In this case, the curing agent composition described above is used in the multi-component epoxy resin system.

The proportion of epoxy resin in the epoxy resin component (A) is >0 wt. % to 100 wt. %, preferably from 10 to 70 wt. % and particularly preferably from 30 wt. % to 60 wt. %, based on the total weight of the epoxy resin component (A).

In addition to the epoxy resins, the epoxy resin component (A) may optionally contain at least one reactive diluent. Glycidyl ethers of aliphatic, alicyclic or aromatic monoalcohols or in particular polyalcohols having a lower viscosity than epoxies containing aromatic groups are used as reactive diluents. Examples of reactive diluents are monoglycidyl ethers, e.g. o-cresyl glycidyl ether, and glycidyl ethers having an epoxide functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether, trimethylolpropane triglycidyl ether (TMPTGE), or trimethylolethane triglycidyl ether (TMETGE), with trimethylolethane triglycidyl ether being preferred. Mixtures of two or more of these reactive diluents can also be used, preferably mixtures containing triglycidyl ethers, particularly preferably as a mixture of 1,4-butanediol diglycidyl ether (BDDGE) and trimethylolpropane triglycidyl ether (TMPTGE) or 1,4-butanediol diglycidyl ether (BDDGE) and trimethylolethane triglycidyl ether (TMETGE).

The reactive diluents are preferably present in an amount of from 0 wt. % to 60 wt. %, more preferably from 1 wt. % to 20 wt. %, based on the total weight of the epoxy resin component (A).

Suitable epoxy resins and reactive diluents can also be found in the standard reference from Michael Dombusch, Ulrich Christ and Rob Rasing, "Epoxidharze," Vincentz Network GmbH & Co. KG (2015), ISBN 13: 9783866308770. These compounds are included here by reference.

In a further embodiment, the epoxy resin component (A) may contain a co-accelerator, provided that this is compatible with the epoxy resins. Tertiary amines, imidazole or tertiary aminophenols, organophosphines, Lewis bases or acids such as phosphoric acid esters, or mixtures of two or more thereof, may be used as co-accelerators, for example. As mentioned above, these co-accelerators can also be present in the curing agent composition (B).

The proportion of the epoxy resin component (A) in relation to the total weight of the multi-component epoxy resin system is preferably from 5 wt. % to 90 wt. %, more preferably from 20 wt. % to 80 wt. %, even more preferably from 30 wt. % to 70 wt. % or most preferably from 40 wt. % to 60 wt. %.

The epoxy resins can have an EEW of from 120 to 2000 g/Eq, preferably from 140 to 400 g/Eq, in particular from 150 to 300 g/Eq. Mixtures of a plurality of epoxy resins may also be used.

The proportion of the curing agent composition (B) in relation to the total weight of the multi-component epoxy resin system is preferably from 10 wt. % to 95 wt. %, more preferably from 15 wt. % to 80 wt. %, even more preferably from 15 wt. % to 60 wt. % or particularly preferably from 20 wt. % to 40 wt. %.

Furthermore, the epoxy resin component (A) can contain conventional additives, in particular adhesion promoters and fillers, as already described for the curing agent composition.

The adhesion promoter can be contained in an amount of up to 10 wt. %, preferably from 0.1 to 5 wt. %, particularly preferably from 1.0 to 5.0 wt. %, based on the total weight of the epoxy resin component (A).

The inorganic fillers described above are preferably used as fillers. The fillers may also be present in one or all components of the multi-component mortar compound. The proportion of fillers is preferably from 0 wt. % to 90 wt. %, for example from 10 wt. % to 90 wt. %, preferably from 15 wt. % to 75 wt. %, more preferably from 20 wt. % to 50 wt. %, and even more preferably from 25 wt. % to 40 wt. %, based on the total weight of the mortar compound.

Further conceivable additives to the multi-component epoxy resin compound are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, curing catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

Non-reactive diluents (solvents) may preferably also be contained in an amount of up to 30 wt. %, based on the total weight of the relevant component (epoxy resin component and/or curing agent component), for example from 1 wt. % to 20 wt. %. Examples of suitable solvents are alcohols, such as methanol or ethanol, lower alkyl ketones such as acetone, di lower alkyl lower alkanoyl amides such as dimethylacetamide, lower alkyl benzenes such as xylenes or toluene, phthalic acid esters or paraffins.

Further additives of this kind may preferably be added in proportions by weight of a total of from 0 wt. % to 40 wt. %, based on the total weight of the epoxy resin component.

The multi-component epoxy resin system is preferably present in cartridges or film pouches which are characterized in that they comprise two or more separate chambers in which the epoxy resin component (A) and the curing agent composition (B) of the mortar compound are separately arranged so as to prevent a reaction.

For the use as intended of the multi-component epoxy resin system, the epoxy resin component (A) and the curing agent component are discharged out of the separate chambers and mixed in a suitable device, for example a static mixer or dissolver. The mixture of epoxy resin component (A) and curing agent component is then introduced into the previously cleaned borehole by means of a known injection device. The component to be fastened is then inserted into the epoxy resin compound and aligned. The reactive constituents of the curing agent component react with the epoxy resins of the resin component (A) by polyaddition such that the epoxy resin compound cures under environmental conditions within a desired period of time, preferably within hours.

Components A and B are preferably mixed in a ratio that results in a balanced stoichiometry according to the EEW and AHEW values.

The epoxy resin compound according to the invention or the multi-component epoxy resin system according to the invention is preferably used for construction purposes. The expression "for construction purposes" refers to the structural adhesion of concrete/concrete, steel/concrete or steel/steel or one of said materials with other mineral materials, to the structural strengthening of components made of concrete, brickwork and other mineral materials, to reinforcement applications with fiber-reinforced polymers of building objects, to the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. Most particularly preferably, the epoxy resin compounds according to the invention and the multi-component epoxy resin system according to the invention are used for chemically fastening anchoring means.

The present invention also relates to a method for the chemical fastening of construction elements in boreholes, an epoxy resin compound according to the invention or a multi-component epoxy resin system according to the invention being used as described above for the chemical fastening of the construction elements. The method according to the invention is particularly suitable for the structural adhesion of concrete/concrete, steel/concrete or steel/steel or one of said materials with other mineral materials, for the structural strengthening of components made of concrete, brickwork and other mineral materials, for reinforcement applications with fiber-reinforced polymers of building objects, for the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. The method according to the invention is very particularly preferably used for the chemical fastening of anchoring means.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound for the chemical fastening of construction elements, in particular for anchoring fastening elements in boreholes. The epoxy resin compound comprises at least one benzoxazine-amine adduct according to formula Ia and/or formula Ib as described above and an amine which is reactive to epoxy groups. It is preferable for the epoxy resin compound to be in the form of a multi-component epoxy resin system which comprises the epoxy resin component (A) described above and the curing agent component. It is also preferable for the salt (S) to be contained in the curing agent component and thus for a curing agent composition (B) as described above to be used.

The use of at least one salt (S) within the meaning of the present invention as an accelerator in an epoxy resin compound, in particular in a multi-component epoxy resin system, makes it possible to considerably shorten the curing time of the epoxy resin compound and furthermore to ensure sufficient pull-out strength after only four to six hours. Furthermore, the cured epoxy resin compound has excellent pull-out strength at elevated temperatures and in the water-filled borehole.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound, in particular in a multi-component epoxy resin system. The epoxy resin compound comprises at least one benzoxazine-amine adduct according to formula Ia and/or formula Ib as described above and an amine which is reactive to epoxy groups. It is preferable for the epoxy resin compound to be in the form of a multi-component epoxy resin system which comprises the epoxy resin component (A) and curing agent component described above. It is also preferable for the salt (S) to be contained in the curing agent component and thus for a curing agent composition (B) to be used. The use of at least one salt (S) within the meaning of the present invention as an accelerator in an epoxy resin compound, in particular in a multi-component epoxy resin compound and more preferably in the curing agent component of the multi-component epoxy resin compound, makes it possible in particular to increase the pull-out strength of the epoxy resin compound at elevated temperatures, for example in a temperature range of from 35° C. to 50° C.

Furthermore, the use of at least one salt (S) within the meaning of the present invention as an accelerator in an epoxy resin compound, in particular in a multi-component epoxy resin compound and more preferably in the curing agent component of the multi-component epoxy resin compound, makes it possible to increase the pull-out strength of the epoxy resin compounds in water-filled boreholes.

Further advantages of the invention can be found in the following description of preferred embodiments, which are not understood to be in anyway limiting, however. All embodiments of the invention can be combined with one another within the scope of the invention.

EXAMPLES

Epoxy Resin Component (A)
Starting Materials

In the examples, the bisphenol A-based and bisphenol F-based epoxy resins commercially available under the names Araldite GY 240 and Araldite GY 282 (Huntsman), respectively, were used as the epoxy resins.

3-glycidyloxypropyl-trimethoxysysilane available under the name Dynalsylan GLYMO™ (Evonik Industries) was used as the adhesion promoter.

The 1,4-butanediol-diglycidyl ether and trimethyolpropane-triglycidyl ether commercially available under the names Araldite DY-026 and Araldite™ DY-T (Huntsman), respectively, were used as the reactive diluents.

The liquid components were premixed by hand. Subsequently, quartz (Millisil™ W12 from Quarzwerke Frechen) was added as a filler and fumed silica (Cab-O-Sil™ TS-720 from Cabot Rheinfelden) was added as a thickener and the mixture was stirred in the dissolver (PC laboratory system, volume 1 L) for 10 minutes at a negative pressure of 80 mbar at 3500 rpm.

The composition of the epoxy resin component (A) used in the examples is given in table 1 below.

TABLE 1

Composition of epoxy resin component (A)

| Substance | Function | Percent by weight [wt. %] |
|---|---|---|
| 3-glycidyloxypropyl-trimethoxysysilane | Adhesion promoter | 2.6 |
| Bisphenol A-based epoxy resin | Epoxy resin | 31.3 |
| Bisphenol F-based epoxy resin | Epoxy resin | 16.7 |
| 1,4-butanediol-diglycidyl ether | Reactive diluent | 6.0 |
| Trimethyolpropane-triglycidyl ether | Reactive diluent | 6.0 |
| Quartz | Filler | 34.7 |
| Silicic acid | Thickener | 2.7 |
| EEW [g/Eq] | | 256 |

Curing Agent Composition (B)
Starting Materials

The benzoxazines used to prepare the curing agent composition (B) are available under the trade names Araldite MT 35600 CH (benzoxazine A; CAS number: 154505-70-1), Araldite MT 35700 CH (benzoxazine F; CAS number: 214476-06-9) and Araldite MT 35710 FST (benzoxazine FST: mixture of benzoxazine F and 3-phenyl-3,4-dihydro-2H-benzo[e][1,3]oxazine) from Huntsman Advanced Materials, Basel, Switzerland.

1,3-cyclohexanedimethanamine (1,3-BAC), m-xylenediamine (mXDA) from MGC, Japan, 2-piperazino-ethylamine (N-AEP) from Sigma Aldrich Germany, isophorone diamine (IPDA) from Evonik Degussa, Germany and 2-methlypentamethylenediamine (Dytek A) from Invista, the Netherlands, were used as amines for preparing the curing agent composition (B).

3-aminopropyl-triethoxysilane, which is available under the trade name Dynasylan AMEO from Evonik Degussa, was used as an adhesion promoter.

Quartz (Millisil™ W12 from Quarzwerke Frechen) and calcium aluminate cement (Secar 80 from Kemeos SA) were used as a filler and fumed silica (Cab-O-Sil™ TS-720 from Cabot Rheinfelden) was used as a thickener.

Preparation of the Benzoxazine-Amine Adduct

The corresponding benzoxazine was dissolved in excess amine and the solution was heated, with stirring, for 24 hours to 55° C. (for B2: 80° C.). A yellow to yellow-brown viscous solution was obtained (benzoxazine/amine adduct approx. 60% in amine).

The following benzoxazine-amine adducts were prepared:
B1: Benzoxazine FST/1,3-BAC, 60% in 1,3-BAC
B2: Benzoxazine F/IPDA, 60% in IPDA
B3: Benzoxazine F/mXDA, 60% in mXDA
B4: Benzoxazine A/N-AEP, 60% in N-AEP Accelerator The constituents given in table 2 below were used to prepare the salts (S) or accelerators used in the curing agent composition (B).

TABLE 2

List of salts (S) or accelerators used

| Salt (S) or accelerator | Trade name | Manufacturer |
|---|---|---|
| Calcium nitrate | Calcium nitrate tetrahydrate | Sigma-Aldrich |
| Calcium carbonate | Calcium carbonate | Sigma-Aldrich |
| Nitric acid 70% | Nitric acid | Sigma-Aldrich |
| Sodium iodide | Sodium iodide | Sigma-Aldrich |
| Calcium triflate | Calcium trifluoromethanesulfonate | Sigma-Aldrich |
| 2,4,6-tris(dimethylaminomethyl)phenol, bis[(dimethylamino)methyl]phenol | Ancamin K54 | Evonik |

The salts calcium nitrate and sodium iodide were used as solutions in glycerol (1,2,3-propanetriol, CAS No. 56-81-5, Merck, G). To prepare the calcium nitrate solution, 400.0 g calcium nitrate tetrahydrate was added to 100.0 g glycerol and stirred at 50° C. until completely dissolved (3 hours). The solution prepared in this way contained 80.0% calcium nitrate tetrahydrate. To prepare the sodium iodide solution, 36.4 g sodium iodide was added to 63.6 g glycerol and stirred at 50° C. until completely dissolved. The solution prepared in this way contained 36.4% sodium iodide.

Calcium triflate was dissolved as a solid in the amine of the particular curing agent.

A calcium nitrate/nitric acid solution was also used as the accelerator. To prepare this solution, 52.6 g calcium carbonate was slowly added to 135.2 g nitric acid and then stirred for 5 minutes.

Examples 1 to 7

To prepare the curing agent composition (B) according to examples 1 to 7 below, the relevant benzoxazine-amine adduct was used as a solution in the relevant amine and diluted with the relevant further amine in accordance with the tables below. The accelerator was added, and quartz powder and silicic acid were then added and stirred in the dissolver (PC laboratory system, volume 1 L) for 10 minutes under a vacuum at 3500 rpm.

The composition of the curing agent compositions (B) prepared in this way is given in table 3 below:

TABLE 3

Composition of the curing agent composition (B) in wt. %

| | Example | 1 | 2 | 3 | 4 | 5 | 6 | 7 |
|---|---|---|---|---|---|---|---|---|
| Benzoxazin-amine adduct | B1 | 27.3 | — | — | — | — | — | — |
| | B2 | — | 26.6 | — | — | — | — | — |
| | B3 | — | — | 28.9 | — | — | — | — |
| | B4 | — | — | — | 52.3 | 28.5 | 26.25 | 28.9 |
| Amine | IPDA | 27.3 | 26.6 | — | — | — | — | — |
| | 1,3-BAC | — | — | 28.9 | — | — | — | — |
| | N-AEP | — | — | — | 4.75 | — | — | — |
| | DYTEK A | — | — | — | — | 28.5 | 26.25 | 28.9 |
| Salt (S) | Calcium nitrate | 6.25 | 7.6 | — | 3.75 | 3.75 | — | — |
| | Calcium nitrate/nitric acid | — | — | 3.0 | — | — | — | — |
| | Sodium iodide | — | — | — | — | — | 8.3 | — |
| | Calcium triflate | — | — | — | — | — | — | 3.0 |
| | Adhesion promoter | 2.4 | 2.4 | 2.4 | 2.4 | 2.4 | 2.4 | 2.4 |
| | Quartz | 19.4 | 19.5 | 19.5 | 19.5 | 19.55 | 19.5 | 19.5 |
| | Calcium aluminate cement | 13.0 | 13.0 | 13.0 | 13.0 | 13.0 | 13.0 | 13.0 |
| | Thickener | 4.3 | 4.3 | 4.3 | 4.3 | 4.3 | 4.3 | 4.3 |
| | AHEW [g/Eq] | 87 | 103 | 73 | 127 | 73 | 80 | 72 |

Comparative Example 1 to 5

To prepare the curing agent composition (B) according to comparative examples 1 to 5 below, the relevant benzoxazine-amine adduct was used as a solution in the relevant amine and diluted with the relevant further amine in accordance with the tables below. The accelerator was added, and quartz powder and silicic acid were then added and stirred in the dissolver (PC laboratory system, volume 1 L) for 10 minutes at a negative pressure of 80 mbar at 3500 rpm.

Table 4 shows the composition of the curing agent components (B) from comparative examples 1 to 5.

TABLE 4

Composition of the curing agent composition (B) in wt. %

| | Comparative Example | 1 | 2 | 3 | 4 | 5 |
|---|---|---|---|---|---|---|
| Benzoxazin-amine adduct | B1 | 29.2 | — | — | — | — |
| | B2 | — | 29.2 | — | — | — |
| | B3 | — | — | 29.2 | — | — |
| | B4 | — | — | — | 53.5 | 29.2 |
| Amine | IPDA | 29.2 | 29.2 | — | — | — |
| | 1,3-BAC | — | — | 29.2 | — | — |
| | N-AEP | — | — | — | 4.9 | — |
| | DYTEK A | — | — | — | — | 29.2 |
| Accelerator | Ancamin K54 | 2.4 | 2.4 | 2.4 | 2.4 | 2.4 |
| | Adhesion promoter | 2.4 | 2.4 | 2.4 | 2.4 | 2.4 |
| | Quartz | 19.5 | 19.5 | 19.5 | 19.5 | 19.5 |
| | Calcium aluminate cement | 13.0 | 13.0 | 13.0 | 13.0 | 13.0 |
| | Thickener | 4.3 | 4.3 | 4.3 | 4.3 | 4.3 |
| | AHEW [g/Eq] | 81 | 93 | 72 | 124 | 72 |

Mortar Compounds and Pull-Out Tests

The epoxy resin component (A) and the curing agent composition (B) were mixed in a speed mixer in a ratio resulting in a balanced stoichiometry according to the EEW and AHEW values. The mixture was poured into a one-component cartridge as far as possible without bubbles, and was immediately injected into the borehole made for the pull-out tests.

The pull-out strength of the mortar compounds obtained by mixing the epoxy resin component (A) and the curing agent composition (B) according to the above examples was determined using a high-strength threaded anchor rod M12 according to ETAG 001 Part 5, which was doweled into a hammer-drilled borehole having a diameter of 14 mm and a borehole depth of 69 mm with the relevant mortar compound in C20/25 concrete. The boreholes were cleaned by means of compressed air (2×6 bar), a wire brush (2×) and again by compressed air (2×6 bar).

The boreholes were filled up, by two thirds from the bottom of the borehole, with the mortar compound to be tested in each case. The threaded rod was pushed in by hand. The excess mortar was removed using a spatula.

The curing time in test 1 was 4 hours at 21° C. In test 2, the curing time was 6 hours at 21° C. In test 3, the curing time was 24 hours at 21° C.

The failure load was determined by centrally pulling out the threaded anchor rod with close support. The load values obtained with the mortar compounds using a curing agent composition (B) according to examples 1 to 7 and comparative examples 1 to 5 are shown in table 5 below.

TABLE 5

Determination of the load values

| | | Load value [N/mm²] | | | | | | | | | | | |
|---|---|---|---|---|---|---|---|---|---|---|---|---|---|
| Pull-out tests | Test number | Examples | | | | | | | Comparative examples | | | | |
| | | 1 | 2 | 3 | 4 | 5 | 6 | 7 | 1 | 2 | 3 | 4 | 5 |
| 4 h curing | 1 | 12.7 | 4.6 | 25.5 | 19.3 | 25.0 | 21.8 | 26.7 | 0.1 | 0.0 | 1.1 | 16.3 | 2.5 |
| 6 h curing | 2 | 15.1 | 13.1 | 33.0 | 24.8 | 30.0 | 27.8 | 30.7 | 5.2 | 0.3 | 23.9 | 25.5 | 23.4 |
| 24 h curing | 3 | 31.6 | 33.2 | 35.9 | 28.9 | 36.2 | 34.3 | 34.1 | 31.6 | 29.5 | 36.0 | 27.8 | 33.2 |

The pull-out tests show that the mortar compounds of the examples according to the invention each have significantly higher load values after a curing time of only 4 hours than the mortar compounds of the comparative examples. The mortar compounds of comparative examples 1, 2, 4 and 5 were still soft after a curing time of 4 hours. The pull-out tests after 6 hours show the further progress of the curing of the mortar compounds, with the examples according to the invention each having significantly higher load values after 6 hours of curing time than the mortar compounds of the comparative examples.

The invention claimed is:

1. A curing agent composition (B), comprising:
a benzoxazine-amine adduct selected from the group consisting of substances according to formula Ia, substances according to formula Ib and mixtures thereof, having the following structures:

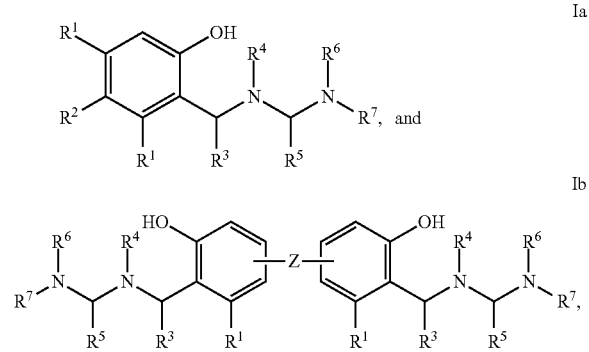

where $R^1$, $R^2$, $R^3$, $R^4$ and $R^5$ are each independently selected from the group consisting of H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid, alkylsulfonyl groups, and also from combinations of two or more of these groups, wherein the groups are each unsubstituted or optionally substituted;

where $R^6$ and $R^7$ each independently represent H or an amino, diamino or polyamino group selected from the group consisting of aliphatic, alicyclic, aromatic or araliphatic amine groups, and also combinations of two or more of these groups, wherein the groups are each unsubstituted or optionally substituted;

where Z is selected from the group consisting of a direct bond, —C(O)—, —S—, —O—, —S(O)—, —S(O)$_2$—, —C(R$^8$)(R$^9$)—, —[C(R$^8$)(R$^9$)]$_m$—C(R$^8$)(R$^9$)—[C(R$^{10}$)(R$^{11}$)]$_n$—, —[C(R$^8$)(R$^9$)]$_m$—C(R$^8$)(aryl)-[C(R$^{10}$)(R$^{11}$)]$_n$—, —[C(R$^8$)(R$^9$)]$_m$—C(O)—[C(R$^{10}$)(R$^{11}$)]$_n$—, —[C(R$^8$)(R$^9$)]$_m$—S—[C(R$^{10}$)(R$^{11}$)]$_n$—, —[C(R$^8$)(R$^9$)]$_m$—O—[C(R$^{10}$)(R$^{11}$)]$_n$—, —[C(R$^8$)(R$^9$)]$_m$—S(O)—[C(R$^{10}$)(R$^{11}$)]$_n$—, —[C(R$^8$)(R$^9$)]$_m$—S(O)$_2$—[C(R$^{10}$)(R$^{11}$)]$_n$—, a divalent heterocycle and —[C(R$^8$)(R$^9$)]$_m$-arylene-[C(R$^{10}$)(R$^{11}$)]$_n$—, where m and n are each independently between 0 and 10, where $R^8$, $R^9$, $R^{10}$ and $R^{11}$ each independently have the same meaning as the groups $R^1$ to $R^5$, or $R^8$ and $R^9$ together form a lactone group; and an amine which is reactive to epoxy groups and is selected from the group consisting of aliphatic, alicyclic, aromatic and araliphatic amines and which has on average per molecule at least two reactive hydrogen atoms bonded to a nitrogen atom, wherein the curing agent composition comprises at least one salt (S) selected from the group consisting of salts of nitric acid, salts of nitrous acid, salts of halogens, salts of trifluoromethanesulfonic acid and combinations thereof, and wherein, when the curing agent composition is present in an epoxy resin compound comprising at least one curable epoxy resin, the epoxy resin compound has a curing time of 24 hours or less at 21° C.

2. The curing agent composition according to claim 1, wherein $R^3$ and $R^5$ each represent H.

3. The curing agent composition (B) according to claim 1, wherein $R^3$ and $R^5$ each represent H, and wherein Z is a direct bond or —C(R$^8$)(R$^9$)—, where $R^8$ and $R^9$ are each independently selected from H or $C_1$-$C_4$ alkyl groups, or together form a lactone group.

4. The curing agent composition according to claim 1, wherein the amine reactive to epoxy groups is selected from the group consisting of 2,2,4- or 2,4,4-trimethyl-1,6-diaminohexane and mixtures thereof, 3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1,5-pentanediamine (DYTEK A), (3(4),8(9)bis(aminomethyl)dicyclo[5.2.1.0²,⁶]decane and isomer mixtures thereof (TCD-diamine), aminomethyltricyclo[5.2.1.0²,⁶]decane and isomer mixtures thereof (TCD-amine), 1,6-hexamethylene diamine, diethylene triamine (DETA), triethylene tetramine (TETA), tetraethylene pentamine (TEPA), pentaethylene hexamine (PEHA), 1,3-benzenedimethanamine (mXDA), 1,4-benzenedimethanamine (pXDA), N,N'-dimethyl-1,3-benzenedimethanamine, and mixtures of two or more thereof.

5. The curing agent composition according to claim 4, wherein the amine reactive to epoxy groups is selected from the group consisting of 3-aminomethyl-3,5,5-trimethylcyclohexane (IPDA), 2-methyl-1,5-pentanediamine (DYTEK A), 1,3-benzenedimethanamine (mXDA), 1,3-bis(aminomethyl)-cyclohexane (1,3-BAC) and mixtures thereof.

6. The curing agent composition according to claim 1, wherein the at least one salt (S) is selected from the group consisting of nitrate ($NO_3^-$) salts, iodide ($I^-$) salts, triflate ($CF_3SO_3^-$) salts and mixtures thereof.

7. The curing agent composition according to claim 1, wherein the at least one salt (S) is contained in the curing agent composition in an amount of from 0.1 to 15 wt. %, based on the total weight of the curing agent composition.

8. An epoxy resin compound, comprising:
at least one curable epoxy resin; and
a curing agent composition according to claim 1.

9. The epoxy resin compound according to claim 8, wherein the epoxy resin compound is a multi-component epoxy resin compound.

10. A method for the chemical fastening of a construction element in boreholes, the method comprising:
chemical fastening of the construction element with an epoxy resin compound according to claim 8.

11. A method, comprising:
accelerating an epoxy resin compound with at least one salt (S) selected from the group consisting of salts of nitric acid, salts of nitrous acid, salts of halogens, salts of trifluoromethanesulfonic acid and combinations thereof, thereby obtaining the epoxy resin compound of claim 8.

12. A cured compound comprising the epoxy resin compound according to claim 8 in cured form.

13. The curing agent composition according to claim 1, wherein Z is selected from the group consisting of a direct bond, —$C(R^8)(R^9)$—, —$C(R^8)(aryl)$-, —C(O)—, —S—, —O—, —S(O)—, —$S(O)_2$—, a divalent heterocycle, and —$[C(R^8)(R^9)]_m$-arylene-$[C(R^{10})(R^{11})]_n$—, where m and n are each independently between 0 and 5.

14. The curing agent composition according to claim 1, wherein the benzoxazine-amine adduct is obtained by reacting a benzoxazine with an amine selected from the group consisting of aliphatic and/or araliphatic amines, diamines, polyamines, and mixtures thereof,
wherein the benzoxazine has one of the following structures:

IIc

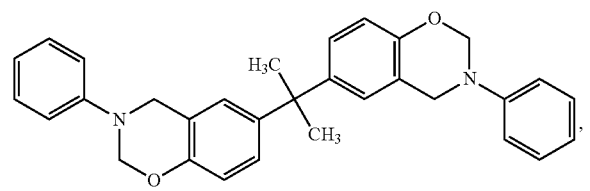

IId

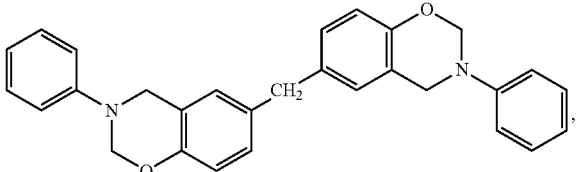

IIe

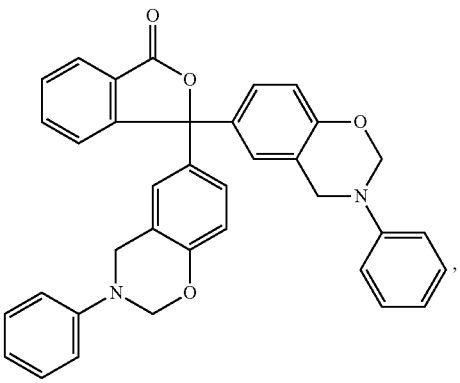

IIf

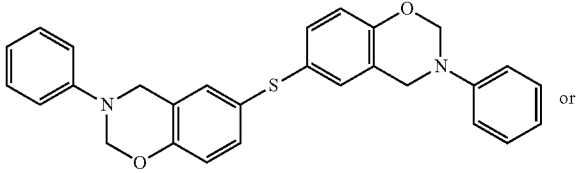

or

IIg

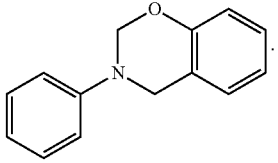

15. The curing agent composition according to claim 1, wherein, when the curing agent composition is present in an epoxy resin compound comprising at least one curable epoxy resin, the epoxy resin compound has a curing time of 6 hours or less at 21° C.

16. A multi-component epoxy resin system, comprising:
an epoxy resin component (A), and
a curing agent component,
wherein the epoxy resin component (A) contains a curable epoxy resin, and the curing agent component comprises a benzoxazine-amine adduct and an amine which is reactive to epoxy groups,
wherein the benzoxazine-amine adduct is selected from the group consisting of substances according to formula Ia, substances according to formula Ib and mixtures thereof, having the following structures:

Ia

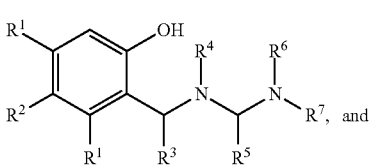

-continued

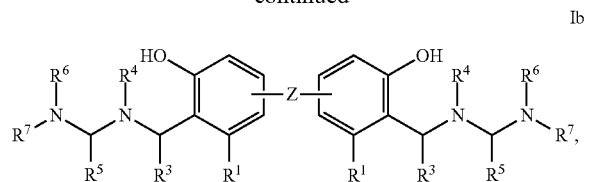
Ib

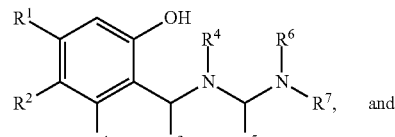
Ia

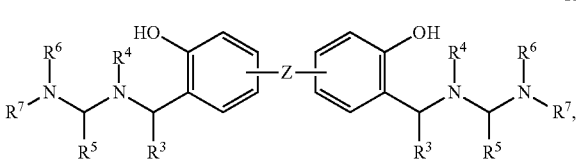
Ib where $R^1$, $R^2$, $R^3$, $R^4$ and $R^5$ are each independently selected from the group consisting of H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid, alkylsulfonyl groups, and also from combinations of two or more of these groups, wherein the groups are each unsubstituted or optionally substituted;

where $R^6$ and $R^7$ each independently represent H or an amino, diamino or polyamino group selected from the group consisting of aliphatic, alicyclic, aromatic or araliphatic amine groups, and also combinations of two or more of these groups, wherein the groups are each unsubstituted or optionally substituted;

where Z is selected from the group consisting of a direct bond, —C(O)—, —S—, —O—, —S(O), —S(O)$_2$—, —C(R$^8$)(R$^9$)—, —[C(R$^8$)(R$^9$)]$_m$—C(R$^8$)(R$^9$)—[C(R$^{10}$)(R$^{11}$)]$_n$—, —[C(R$^8$)(R$^9$)]$_m$—C(R$^8$)(aryl)-[C(R$^{10}$)(R$^{11}$)]$_n$—, —[C(R$^8$)(R$^9$)]$_m$—C(O)—[C(R$^{10}$)(R$^{11}$)]$_n$—, —[C(R$^8$)(R$^9$)]$_m$—S—[C(R$^{10}$)(R$^{11}$)]$_n$—, —[C(R$^8$)(R$^9$)]$_m$—O—[C(R$^{10}$)(R$^{11}$)]$_n$—, —[C(R$^8$)(R$^9$)]$_m$—S(O)—[C(R$^{10}$)(R$^{11}$)]$_n$—, —[C(R$^8$)(R$^9$)]$_m$—S(O)$_2$—[C(R$^{10}$)(R$^{11}$)]$_n$—, a divalent heterocycle and —[C(R$^8$)(R$^9$)]$_m$-arylene-[C(R$^{10}$)(R$^{11}$)]$_n$—, where m and n are each independently between 0 and 10, where $R^8$, $R^9$, $R^{10}$, and $R^{11}$ each independently have the same meaning as the groups $R^1$ to $R^5$, or $R^8$ and $R^9$ together form a lactone group;

wherein the amine which is reactive to epoxy groups is selected from the group consisting of aliphatic, alicyclic, aromatic and araliphatic amines and has on average per molecule at least two reactive hydrogen atoms bonded to a nitrogen atom, wherein a salt (S) selected from the group consisting of salts of nitric acid, salts of nitrous acid, salts of halogens, salts of trifluoromethanesulfonic acid and combinations thereof is contained in the epoxy resin component (A) and/or in the curing agent component, and wherein the epoxy resin component and the curing agent component, when combined, form a composition that has a curing time of 24 hours or less at 21° C.

17. The multi-component epoxy resin system according to claim 16, wherein the salt (S) is contained in the curing agent component.

18. A method for the chemical fastening of a construction element in boreholes, the method comprising:
chemical fastening of the construction element with a multi-component epoxy resin system according to claim 16.

19. A curing agent composition (B), comprising:
a benzoxazine-amine adduct selected from the group consisting of substances according to formula Ia, substances according to formula Ib and mixtures thereof, having the following structures:

where $R^1$, $R^2$, $R^3$, $R^4$ and $R^5$ are each independently selected from the group consisting of H, alkyl, cycloalkyl, heterocycloalkyl, aryl, heteroaryl, arylalkyl, heteroalkyl, alkoxy, hydroxyl, hydroxyalkyl, carboxyl, halo, haloalkyl, amino, aminoalkyl, alkylcarbonyloxy, arylcarbonyloxy, alkoxycarbonyl, alkylcarbonyl, alkylsulfonylamino, aminosulfonyl, sulfonic acid, alkylsulfonyl groups, and also from combinations of two or more of these groups, wherein the groups are each unsubstituted or optionally substituted;

where $R^6$ and $R^7$ each independently represent H or an amino, diamino or polyamino group selected from the group consisting of aliphatic, alicyclic, aromatic or araliphatic amine groups, and also combinations of two or more of these groups, wherein the groups are each unsubstituted or optionally substituted;

where Z is selected from the group consisting of a direct bond, —C(O)—, —S—, —O—, —S(O)—, —S(O)$_2$—, —C(R$^8$)(R$^9$)—, —[C(R$^8$)(R$^9$)]$_m$—C(R$^8$)(R$^9$)—[C(R$^{10}$)(R$^{11}$)]$_n$—, —[C(R$^8$)(R$^9$)]$_m$—C(R$^8$)(aryl)-[C(R$^{10}$)(R$^{11}$)]$_n$—, —[C(R$^8$)(R$^9$)]$_m$—C(O)—[C(R$^{10}$)(R$^{11}$)]$_n$—, —[C(R$^8$)(R$^9$)]$_m$—S—[C(R$^{10}$)(R$^{11}$)]$_n$—, —[C(R$^8$)(R$^9$)]$_m$—O—[C(R$^{10}$)(R$^{11}$)]$_n$—, —[C(R$^8$)(R$^9$)]$_m$—S(O)—[C(R$^{10}$)(R$^{11}$)]$_n$—, —[C(R$^8$)(R$^9$)]$_m$—S(O)$_2$—[C(R$^{10}$)(R$^{11}$)]$_n$—, a divalent heterocycle and —[C(R$^8$)(R$^9$)]$_m$-arylene-[C(R$^{10}$)(R$^{11}$)]$_n$—, where m and n are each independently between 0 and 10, where $R^8$, $R^9$, $R^{10}$ and $R^{11}$ each independently have the same meaning as the groups $R^1$ to $R^5$, or $R^8$ and $R^9$ together form a lactone group; and an amine which is reactive to epoxy groups and is selected from the group consisting of 2,2,4- or 2,4,4-trimethyl-1,6-diaminohexane and mixtures thereof, 3-aminomethyl-3,5,5-trimethylcyclohexane (IPDA), 1,3-bis(aminomethyl)-cyclohexane (1,3-BAC), 1,4-bis(aminomethyl)-cyclohexane (1,4-BAC), 2-methyl-1,5-pentanediamine (DYTEK A), (3(4),8(9)bis(aminomethyl)dicyclo[5.2.1.02,6]decane and isomer mixtures thereof (TCD-diamine), aminomethyltricyclo[5.2.1.02.6]decane and isomer mixtures thereof (TCD-amine), 1,6-hexamethylene diamine, diethylene triamine (DETA), triethylene tetramine (TETA), tetraethylene pentamine (TEPA), pentaethylene hexamine (PEHA), 1,3-benzenedimethanamine (mXDA), 1,4-benzenedimethanamine (pXDA), N,N'-dimethyl-1,3-benzenedimethanamine, and mixtures of two or more thereof, wherein the curing agent composition comprises at least one salt (S) selected from the group consisting of salts of nitric acid, salts of nitrous acid, salts of halogens, salts of trifluoromethanesulfonic acid and combinations thereof.

20. The curing agent composition according to claim 19, wherein the amine reactive to epoxy groups is selected from the group consisting of 3-aminomethyl-3,5,5-trimethylclyclohexane (IPDA), 2-methyl-1,5-pentanediamine (DYTEK A), 1,3-benzenedimethanamine (mXDA), 1,3-bis(aminomethyl)-cyclohexane (1,3-BAC) and mixtures thereof.

21. An epoxy resin compound, comprising:
   at least one curable epoxy resin; and
   a curing agent composition according to claim 19.

* * * * *